United States Patent [19]
Mattson

[11] Patent Number: 5,399,367
[45] Date of Patent: Mar. 21, 1995

[54] PROCESS FOR BAKING TORTILLA CHIPS

[75] Inventor: David L. Mattson, West Fargo, N. Dak.

[73] Assignee: RDO Specialty Foods Co., Fargo, N. Dak.

[21] Appl. No.: 95,152

[22] Filed: Jul. 20, 1993

[51] Int. Cl.$^6$ ............................................. A21D 6/00
[52] U.S. Cl. ................................... 426/233; 426/505; 426/523
[58] Field of Search ................ 426/233, 505, 523; 99/386, 443 C; 219/388

[56]  References Cited
U.S. PATENT DOCUMENTS

| | | | |
|---|---|---|---|
| 2,942,562 | 9/1956 | Luc | 426/243 |
| 3,993,788 | 11/1976 | Longenecker | 426/523 |
| 4,015,517 | 4/1977 | Pomara, Jr. | 99/443 C |
| 4,122,198 | 10/1978 | Wisdom et al. | 426/496 |
| 4,336,279 | 6/1982 | Metzger | 34/162 |
| 4,592,273 | 6/1986 | Yonezawa | 99/443 C |
| 4,769,252 | 9/1988 | Escamilla | 426/523 |
| 4,876,437 | 10/1989 | Kondo | 219/388 |
| 5,180,601 | 1/1993 | Gaon et al. | 426/243 |
| 5,223,290 | 6/1993 | Alden | 426/523 |

Primary Examiner—George Yeung
Attorney, Agent, or Firm—William A. Birdwell & Associates

[57] ABSTRACT

A process and apparatus for cooking tortilla chips. Toast points on a baked tortilla chip are produced by a process whereby tortilla dough pieces cut to the shape of tortilla chips are placed on a stainless steel, open weave conveyor belt which passes through an electric oven whose temperature is controlled in the range of about 700 to 800 degrees Fahrenheit for about ten to twenty seconds, and thereafter baking the chips at a lower temperature for a longer period of time. By cutting the dough into chips prior to running them through the electric oven on an open weave conveyor belt, a random pattern of toast points is created. By using an electric oven, the temperature can be tightly controlled so as to equilibrate the moisture in the tortilla dough pieces as they are being toasted, thereby saving a moisture content adjusting step before or after the toasting oven, reducing the amount of equipment required to cook the tortilla chips and producing a tortilla chip having desirable taste and appearance characteristics. Thereafter, the toasted tortilla dough pieces are baked in a conventional oven at a lower temperature and longer period of time, thereby producing chips which not only appear and taste like they were toasted, but have a low fat content.

8 Claims, 3 Drawing Sheets

| H1 | H2 | H3 | H4 | H5 | H6 | H7 | H8 | H9 |
|---|---|---|---|---|---|---|---|---|
| HEATER 1 18KW 10X40 IN | HEATER 2 18KW 10X40 IN | HEATER 3 18KW 10X40 IN | HEATER 4 18KW 10X40 IN | HEATER 5 18KW 10X40 IN | HEATER 6 18KW 10X40 IN | HEATER 7 18KW 10X40 IN | HEATER 8 18KW 10X40 IN | HEATER 9 18KW 10X40 IN |

Fig.3

PROCESS FOR BAKING TORTILLA CHIPS

BACKGROUND OF THE INVENTION

This invention relates to processes and apparatuses for baking tortilla chips, and particularly to processes and apparatuses that enable a tortilla chip to be baked, while giving it the appearance and taste of having been fried.

Tortilla chips ordinarily are cooked in one of two ways. One conventional way is simply to bake them at relatively low temperature in a gas fired oven. When cooked in this manner, their appearance is relatively uniform and they may have a relatively low fat content. The other conventional way of cooking tortilla chips is to heat them for about one minute in about 275 degrees Fahrenheit in a gas oven having a conveyer whose effective length is about twenty-five feet, and then dropping them into a deep frying oil. While the latter process produces a somewhat less uniform appearance, brown spots or "toast points" sometimes being produced on the chips, their appearance is still essentially uniform and this process results in a chip with a relatively high fat content.

It is desirable to produce chips with a low fat content, yet which have toast points and which taste like they have been toasted, since these have been found to have appearance and taste characteristics that appeal to consumers. One approach to preparing edible products from a farinaceous dough which are fried or baked, but which have toast points, is described in Wisdom et al. U.S. Pat. No. 4,122,198. That patent describes a process whereby dough formed into a thin layer is selectively or locally toasted to a golden brown or black color without effecting the remaining surface of the dough significantly by contacting the dough with a heated metal object which only touches the intended localized area of the dough, such as a pattern on the periphery of a drum which rolls on the dough as it passes beneath the drum on a conveyer or another drum, or by passing a sheet of dough over a conveyor having upright rod extensions, the tips of which are electrically heated and contact the dough to effect the toasting. However, in that process the dough pieces are preconditioned, either before or after selective toasting, to remove a portion of the moisture, as by use of a heated oven prior to applying the metal object to the chips. While this process produces an advantage over conventional processes, it results in a relatively uniform pattern of toast points, which appears artificial, and requires unnecessary steps and equipment.

It would be desirable to have a process and apparatus for cooking tortilla baked chip products having toast points wherein the toast points appear to be random, so that the chips appear as though they had been fried yet have a low fat content, and which minimize the steps and equipment required to accomplish that result.

SUMMARY OF INVENTION

The aforementioned need for a process and apparatus for providing toast points on a baked tortilla chip are met in the present invention by a process whereby tortilla dough pieces cut to the shape of tortilla chips are placed on a stainless steel, open weave conveyor belt which passes through an electric oven whose temperature is controlled in the range of 700 to 800 degrees Fahrenheit for about ten to twenty seconds, and thereafter baking the chips at a lower temperature of about 450 degrees Fahrenheit for about four minutes. By cutting the dough into chips prior to carrying them through the electric oven on an open weave conveyor belt, a random pattern of toast points is created. By using an electric oven, the temperature can be tightly controlled so as to equilibrate the moisture in the tortilla dough pieces as they are being toasted, thereby saving a moisture content adjusting step before or after the toasting oven, reducing the amount of equipment required to cook the tortilla chips and producing a tortilla chip having desirable taste and appearance characteristics. The use of a stainless steel or equivalent conveyor belt material enables the conveyor belt to carry the tortilla dough pieces through the high temperature toaster oven while maintaining the tensile strength of the belt and preventing oxidation of the belt. Thereafter, the toasted tortilla dough pieces are baked in a conventional oven which may be, for example, gas fired, thereby producing tortilla chips which not only appear and taste like they were toasted, but have a low fat content.

Therefore, it is a principle object of the present invention to provide a novel and improved process and apparatus for cooking tortilla chips.

It is another object of the present invention to provide a process and apparatus for baking tortilla chips which have toast points such that the tortilla chips appear to have been fried.

It is a further object of the present invention to provide a process and apparatus for baking tortilla chips which have a low fat content, yet taste and look like they have been fried.

It is yet another object of the present invention to provide a process for baking tortilla chips having toast points which uses fewer steps than prior processes.

It is yet a further object of the present invention to provide an apparatus for baking tortilla chips which have toast points which employs less equipment than prior apparatuses.

The foregoing and other objects, features and advantages of the invention will be more readily understood upon consideration of the following detailed description of the invention, taken in conjunction with the accompanying drawings.

BRIEF DESCRIPTION OF THE DRAWINGS

FIG. 3 is a schematic diagram of the arrangement of heater elements in the electric oven of FIG. 2.

FIG. 4b is a magnified view of the open weave conveyor belt material of FIG. 4a.

DESCRIPTION OF THE PREFERRED EMBODIMENT

Figure 1:
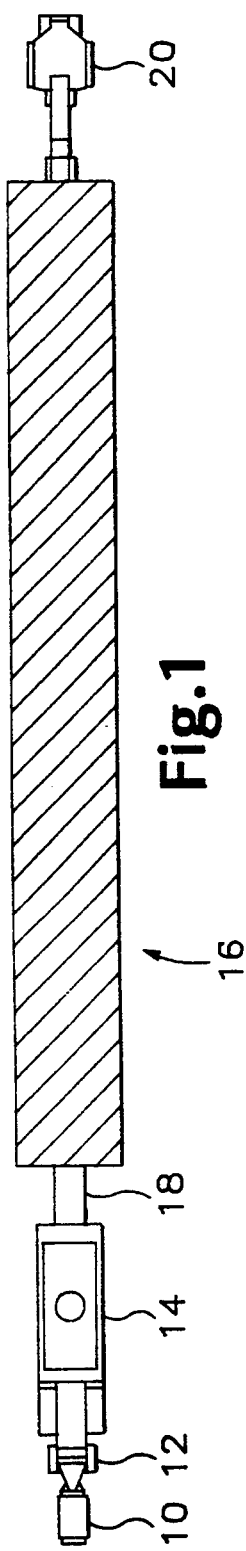
FIG. 1 is a top view of an apparatus for cooking tortilla chips according to the present invention.

The process according to the present invention preferably is carried out in a cooking apparatus as shown in FIG. 1. That apparatus comprises a feeder 10 for placing tortilla dough on a conveyor, a sheeter and cutter 12 for converting the dough to thin pieces in the shape of tortilla chips, a toaster oven 14 for producing toast points on the pieces of tortilla dough and equilibrating the moisture therein, a baking oven 16 for completing the cooking process, and a conveyor 18 for carrying the chips through the baking oven. The conveyor 18 ordinarily would deposit the cooked chips in a bagger 20 for placing the chips in bags.

Figure 2:
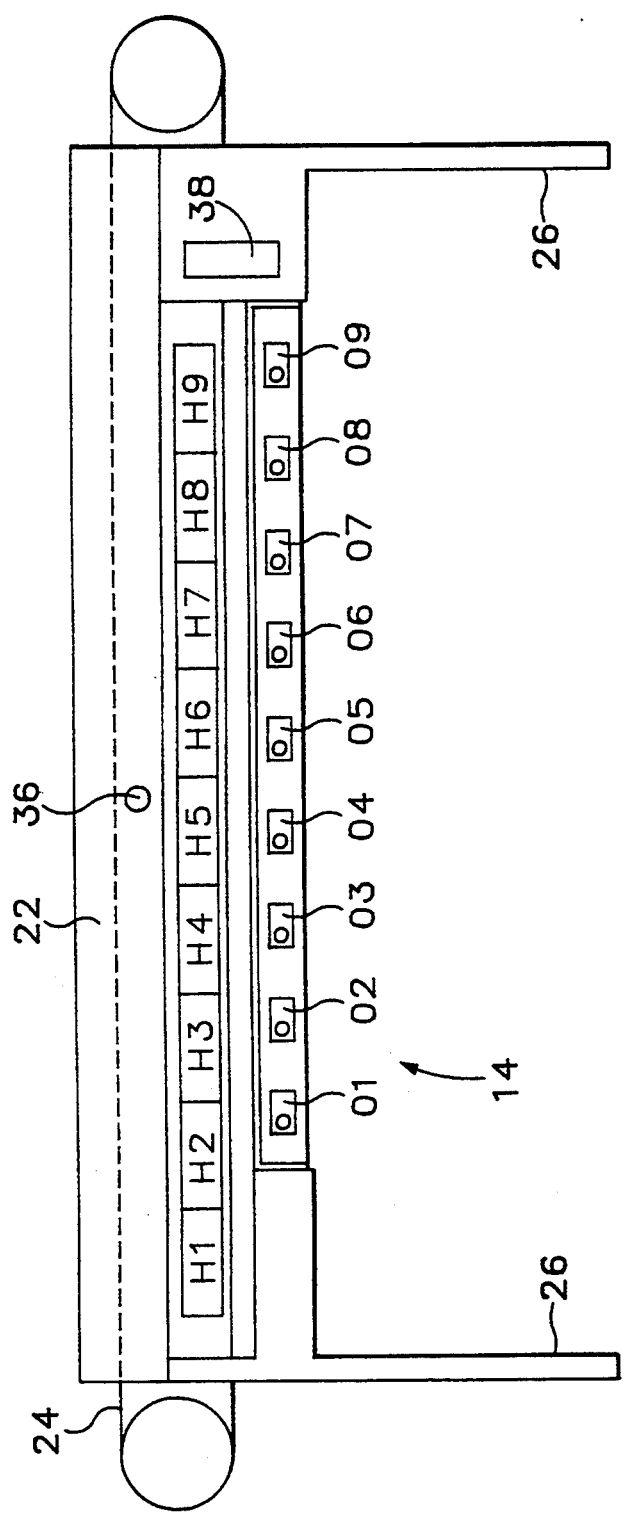
FIG. 2 is a side view of an electric oven for use in toasting tortilla chips according to the present invention.

The toaster oven is shown schematically in FIG. 2. It comprises a toasting chamber 22, a plurality of electric heater elements H1–H9, a corresponding plurality of electric outlets O1–O9 for supplying electricity to the heater elements, a toaster oven conveyor 24 for carrying pieces of tortilla dough through the toaster oven, and legs 26 for supporting the oven.

The heater elements preferably are made in modular form, as shown in FIG. 3, so that they can be individually removed and replaced and so that, if any one element burns out, the overall operation of the toaster oven will not be adversely effected. More specifically, each heater element is plugged into its corresponding electric outlet so that, to replace a heater element the element is unplugged and slid out of the oven, and a new element is slid into its place and plugged into the same outlet. Preferably the heater elements are about 18 kilowatt elements and have a rectangular shape about 10 inches by 40 inches. Preferably, the oven is about 12 feet long and the toaster conveyor 24 operates up to at about 75 feet per minute.

The conveyor 24 of the toaster oven is particularly important. It should have apertures through the large portion of its surface and have an uneven surface. The apertures enable radiant heat to pass therethrough and permit convection currents. The uneven surface promotes equilibration of moisture from the tortilla dough pieces in the toaster oven and the production of random toast points.

Figure 4B:
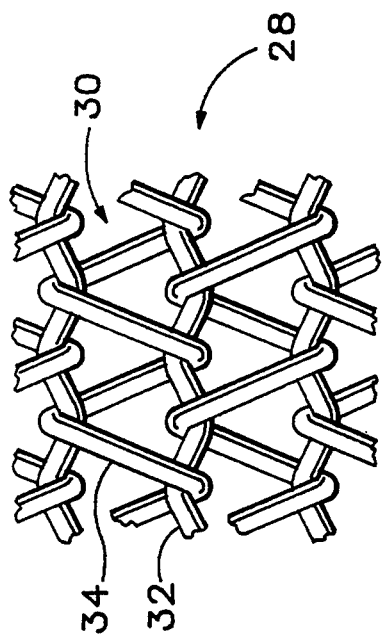
Figure 4A:
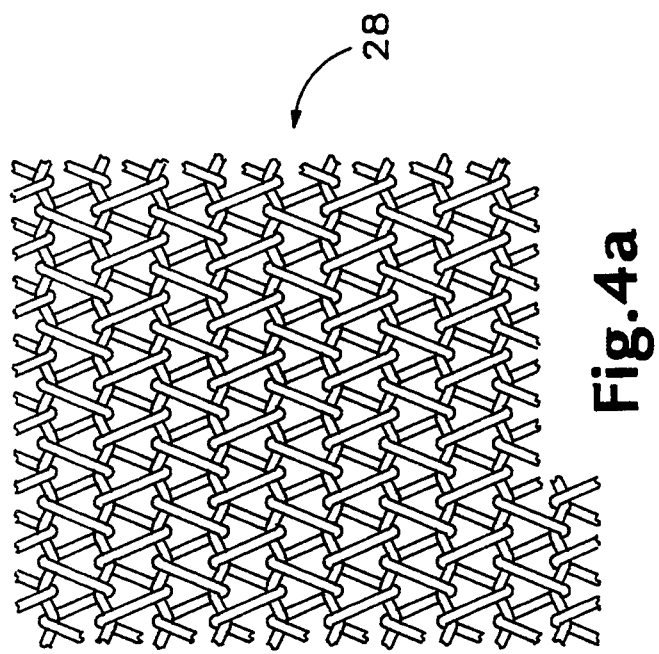
FIG. 4a is an illustration of an open weave conveyor belt material for use in the electric oven according to the present invention.

Referring to FIGS. 4a and 4b, it has been found that a particularly suitable conveyor material is an open weave metal belt 28, as shown in FIG. 4a. A magnified view of the belt 28 is shown in FIG. 4b, wherein aperture 30 and uneven portions 32 and 34 of the surface are more readily apparent. Preferably, the belt 28 is made of stainless steel or its equivalent in order to avoid oxidation and maintain the tensile strength of the belt in the toaster oven.

The toaster oven should be heated to a range of about 700 to 800 degrees Fahrenheit in order to maintain the conveyor belt 24 at a high temperature and thereby produce toast points on the tortilla dough pieces carried by the belt. The tortilla dough pieces should pass through the toasting oven in about 10 to 20 seconds (the "dwell time"). That is, where the temperature is closer to 700 degrees Fahrenheit the time in the toaster oven should be closer to 20 seconds, but when the temperature is closer to 800 degrees Fahrenheit the time should be closer to 10 seconds. It has been found that at temperatures less than about 700 degrees Fahrenheit inadequate toasting occurs, while at temperatures greater than about 800 degrees Fahrenheit burning tends to occur.

A temperature sensor 36 measures the temperature inside the oven and provides a signal to a controller 38 which modulates the electric power provided to the heating elements H1–H9 to maintain the temperature in the oven at the appropriate temperature needed to equilibrate the moisture in the pieces of tortilla dough. Preferably, the temperature should be set to about 750 degrees Fahrenheit and the dwell time set to about 15 seconds to produce the desired moisture content and optimum toasting. The design and construction of such a closed-loop temperature control system is well understood by a person of ordinary skill in the art and is therefore is not described in greater detail herein.

Thence, the process of the invention comprises placing tortilla dough on a cutting and spreading apparatus, producing a plurality of individual pieces of tortilla dough in the shape and size of tortilla chips, placing them on an open weave metal conveyor and carrying them through an electrically heated oven whose temperature preferably is at about 750 degrees Fahrenheit for preferably about 15 seconds. It is to be recognized that precut tortilla dough pieces could be used without departing from the principles of the invention. Thereafter, the chips are baked in another oven at a temperature of about 450 degrees Fahrenheit for about four minutes and deposited in a bag. While the tortilla dough pieces are toasted in the toaster oven, the moisture content is equilibrated by controlling the temperature in the oven.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for cooking tortilla chips, comprising the steps of:
   (a) placing a plurality of tortilla dough pieces having the shape of tortilla chips on a conveying mechanism having apertures therethrough;
   (b) carrying said plurality of tortilla dough pieces on said conveying mechanism through a toaster oven heated to a temperature in the range of about 700 to 800 degrees Fahrenheit for about ten to twenty seconds, thereby toasting said tortilla dough pieces; and
   (c) thereafter baking said plurality of tortilla dough pieces in a baking oven for a predetermined period of time to complete the cooking of the chips.

2. The process of claim 1, wherein said conveying mechanism comprises an open weave metallic conveyor belt.

3. The process of claim 1, wherein said conveying mechanism comprises a conveyor belt having an uneven surface.

4. The process of claim 1, wherein said toaster oven is heated by electric heat.

5. The process of claim 4, wherein the temperature of said toaster oven is maintained by measuring the temperature and adjusting the power to the oven.

6. The process of claim 1, wherein the temperature of said toaster oven is maintained by a closed-loop control system which measures the temperature thereof in order to equilibrate the moisture in said plurality of tortilla dough pieces.

7. The process of claim 1, wherein the temperature is maintained at about 750 degrees Fahrenheit and the pieces of tortilla dough are carried through the toaster oven in about fifteen seconds.

8. The process of claim 1, further comprising, before step (a), the step of cutting a sheet of tortilla dough into pieces the shape of a tortilla chip.

* * * * *